United States Patent [19]

Lin

[11] Patent Number: 5,701,783
[45] Date of Patent: Dec. 30, 1997

[54] SETTING ANGLE ADJUSTER FOR THE CAR HEADLAMP

[76] Inventor: Yu-Chu Lin, No. 477, Chung Shan N. Rd., Yung Kang City, Tainan Hsien, Taiwan

[21] Appl. No.: 520,833

[22] Filed: Aug. 29, 1995

[51] Int. Cl.$^6$ .................... B60Q 1/068; F16H 25/20
[52] U.S. Cl. .................... 74/89.13; 74/89.15; 74/606 R; 362/66
[58] Field of Search .................. 74/89.13, 89.15, 74/606 R; 362/66

[56] References Cited

U.S. PATENT DOCUMENTS

| | | | |
|---|---|---|---|
| 5,355,287 | 10/1994 | Denley | 74/89.15 X |
| 5,483,426 | 1/1996 | Lewis et al. | 74/89.15 X |
| 5,508,896 | 4/1996 | Suchiro et al. | 74/89.15 X |
| 5,546,287 | 8/1996 | Yu | 362/66 |

Primary Examiner—Allan D. Herrmann
Attorney, Agent, or Firm—Morton J. Rosenberg; David L Klein

[57] ABSTRACT

An adjuster for setting the angle of a car headlamp is provided where a gear stand is formed directly in the adjusting stand to provide a transverse holder. An opening slot is formed in the upper side of the transverse holder. Above the opening slot, a space is provided for installing a gear wheel with an operating rod. The transverse holder retains a threaded sleeve, one end of the threaded sleeve is coupled to a gear wheel meshed with the other gear wheel. The internally threaded bore of the sleeve is engaged with an externally threaded slip ring that is coupled to an adjusting rod extending through the sleeve. That combination being covered with a casing.

1 Claim, 4 Drawing Sheets

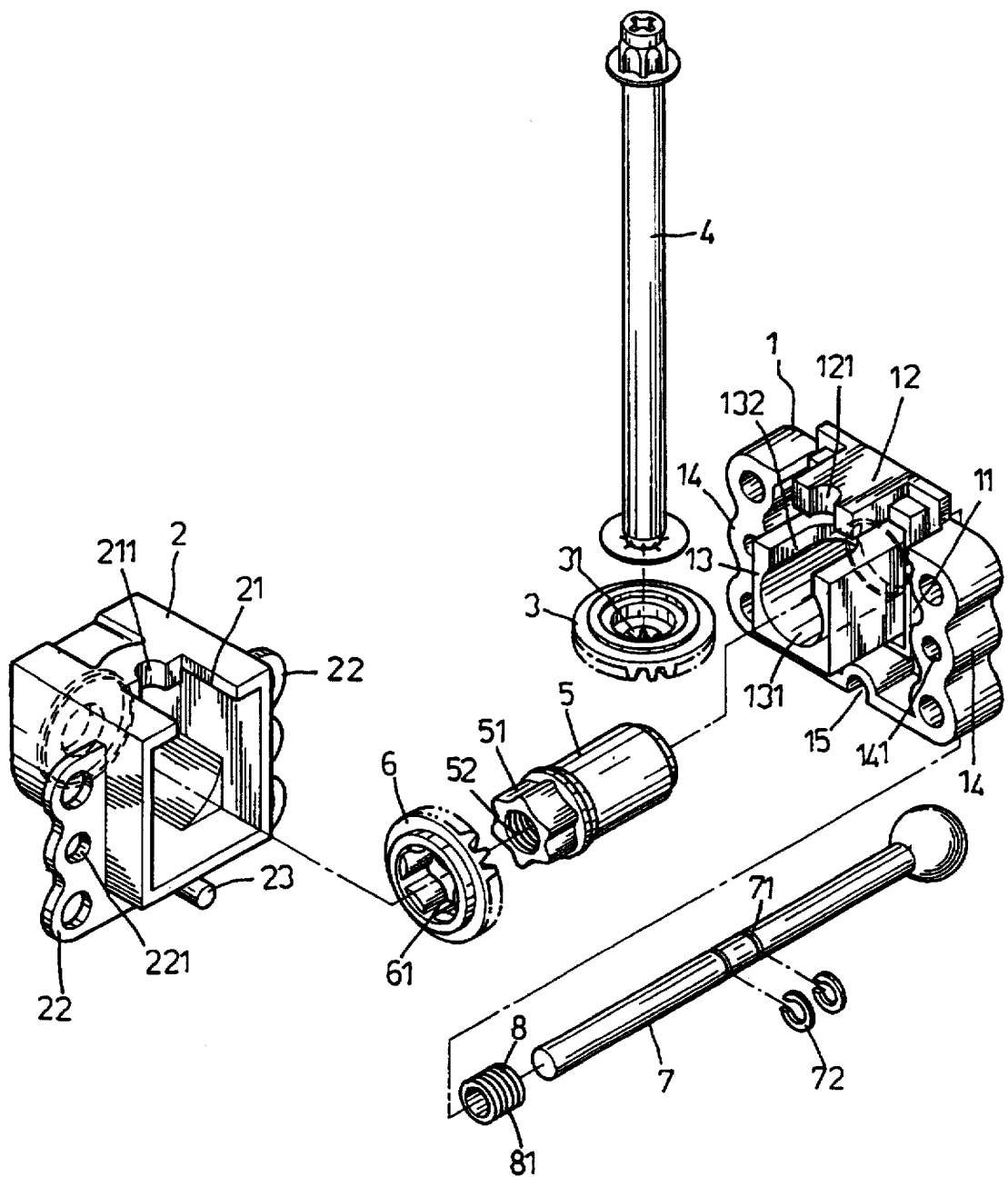
F I G . 1

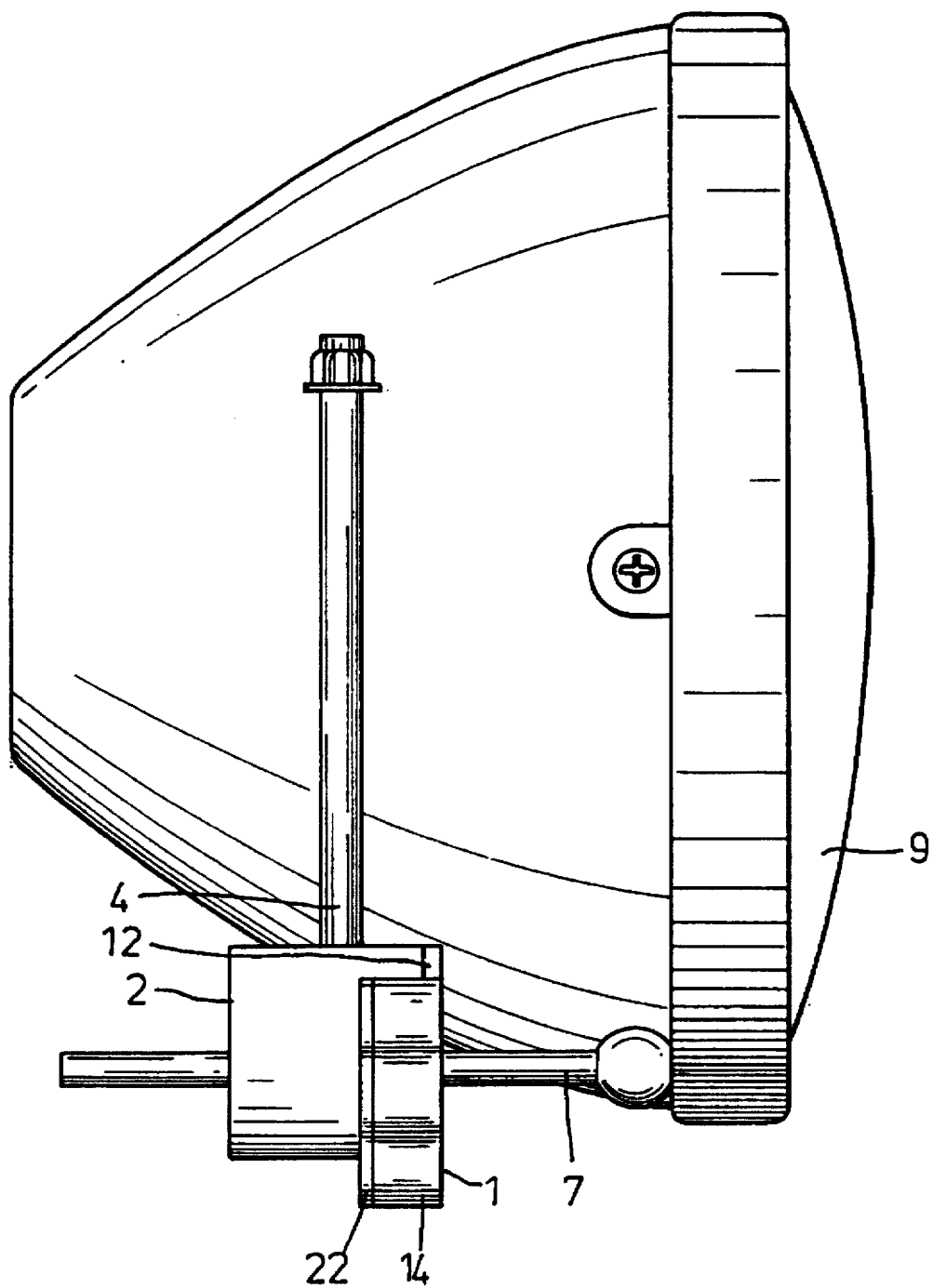
F I G. 3

SETTING ANGLE ADJUSTER FOR THE CAR HEADLAMP

BACKGROUND OF THE INVENTION

1. Field of the Invention

The present invention relates to an adjuster for setting the angle of a car headlamp. More particularly, the present invention is directed to an angle adjuster where an adjusting rod is driven by an operating rod through a couple of gear wheels meshing with each other in a casing.

2. Prior Art

In order to get the best lighting efficiency and meet the requirements of different vehicles with respect to different azimuths and elevations, car headlamps are fastened to adjusters for adjusting and fixing the position of the headlamps. A conventional adjuster for setting the angle of a car headlamp, as shown in FIG. 4, is fastened at the back of the headlamp. A bolt A of the device is connected with the beam holder, and driven to be displaced axially by a vertical adjusting rod B to adjust the headlamp in an up-down or right-left direction.

A threaded sleeve C has a head portion D that is fixed to a gear wheel E located in a holding space F and meshed with a transverse gear wheel G. The bolt A is threaded into the sleeve C and the transverse gear wheel G is connected to the adjusting rod B. When making an adjustment, the adjusting rod B is rotated, thereby causing movement of the gears E, G and the threaded sleeve C together. Rotation of the sleeve C causes the bolt A to be displaced and thereby correspondingly tilt the headlamp to a precise angle.

As can be seen, the conventional adjuster has a complex structure, due to the requirement for a holding space on the setting stand and the fixture stand, separately. Therefore, the work time for producing the mold is increased, as is the production cost. In view of the above-mentioned problem, the present invention provides a device that is more simple, easier to operate and install, and is driven more accurately.

SUMMARY OF THE INVENTION

The present invention is directed to an adjuster for setting the angle of a car headlamp. A feature of the adjuster is the formation of a gear stand directly in the adjusting stand to provide a transverse holder and an opening slot on an upper side thereof. Above the opening slot, a space is provided for installing a gear wheel with an operating rod. The transverse holder retains a threaded sleeve. The threaded sleeve has a head end coupled to a gear wheel meshed with the gear wheel with the operation rod. The sleeve is internally threaded and is engaged with an adjusting rod by a threaded slip ring coupled to the adjusting rod, the combination being covered with a casing.

BRIEF DESCRIPTION OF THE DRAWINGS

FIG. 1 is a perspective exploded view of the present invention;

FIG. 3 is a side view showing an operation of the present invention; and,

DESCRIPTION OF THE PREFERRED EMBODIMENT

Figure 2:
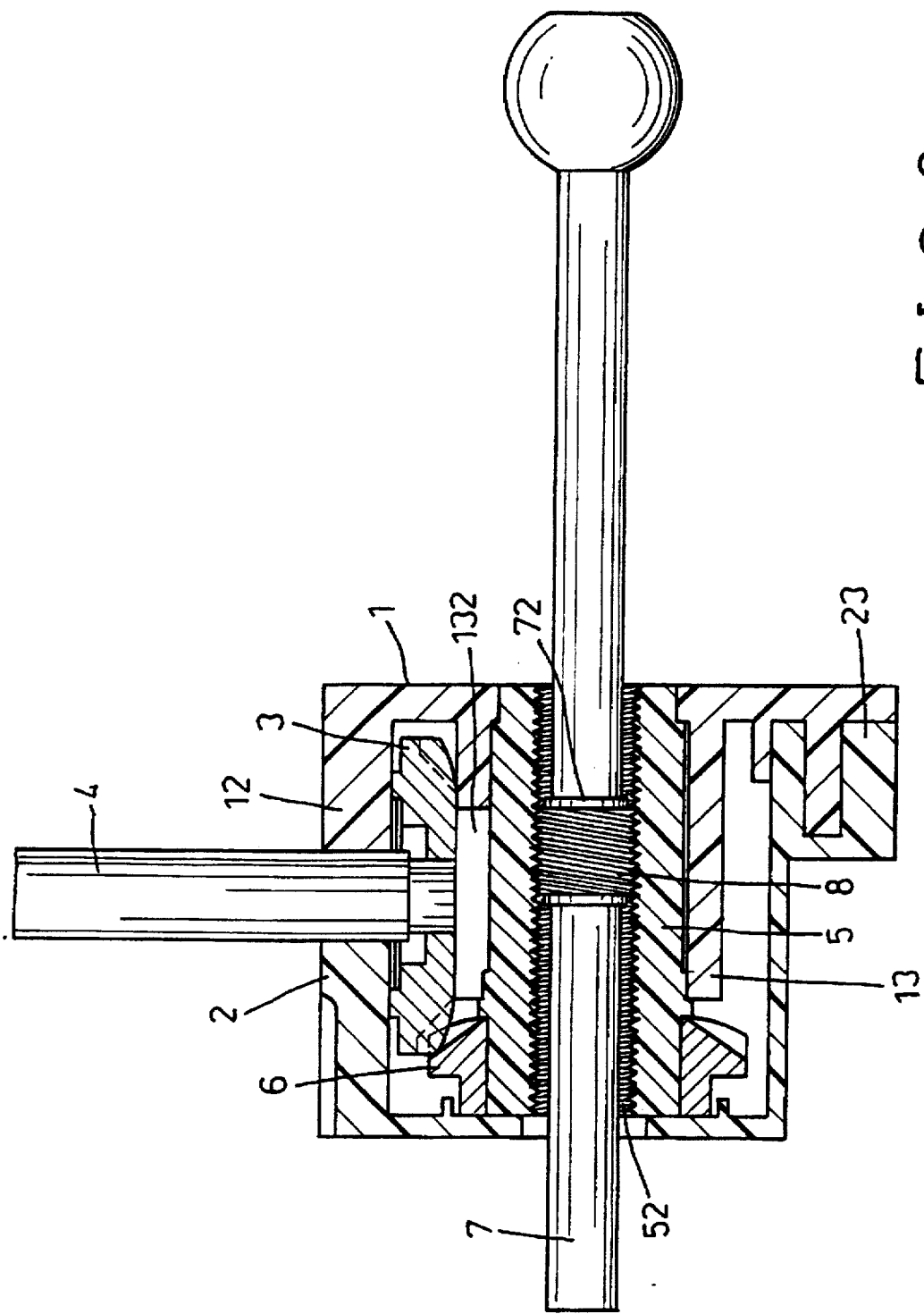
FIG. 2 is a cross-section view of the present invention.
Figure 4:
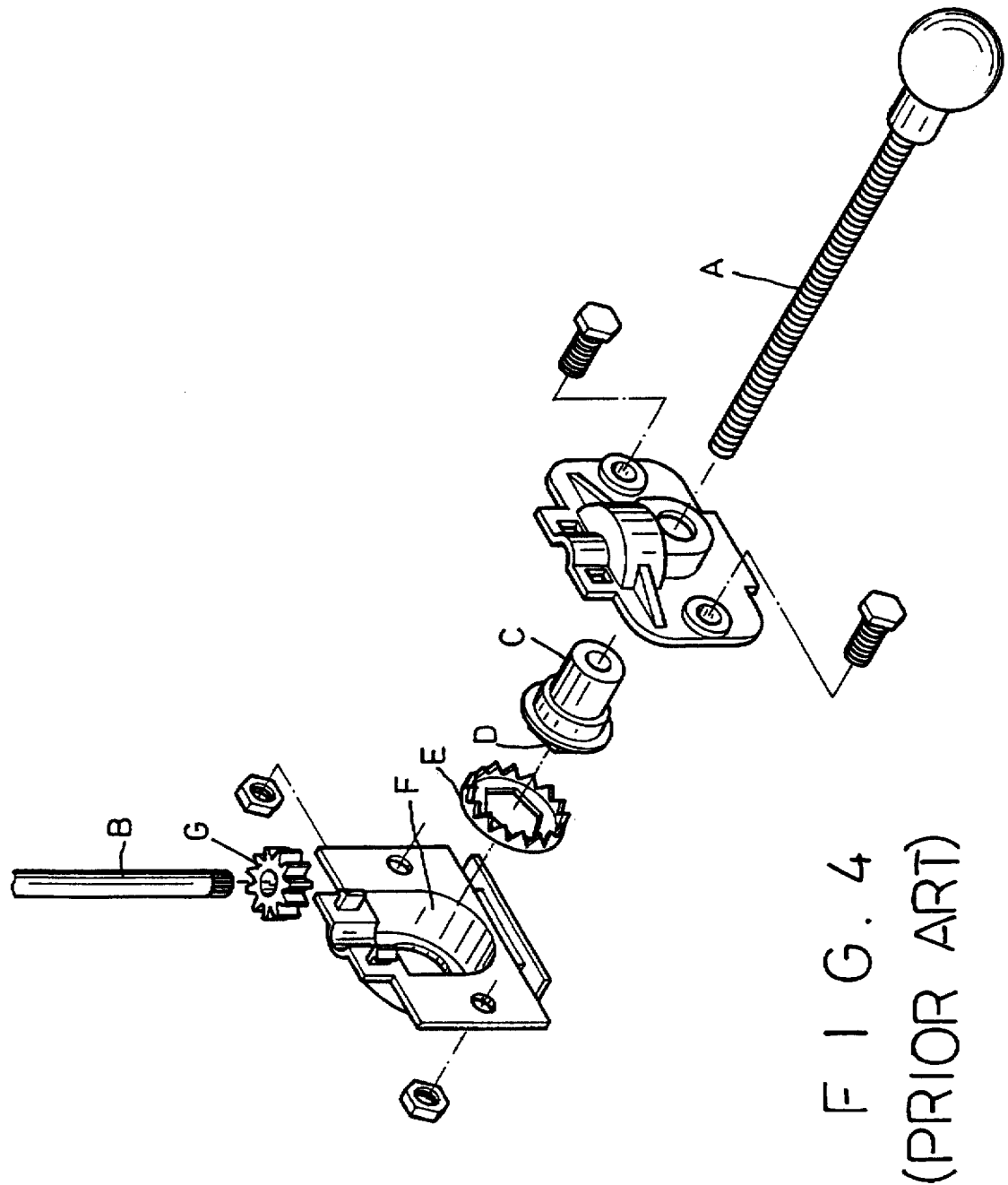
FIG. 4 is a perspective exploded view of a conventional adjuster.

Referring to FIG. 1, an adjuster is shown that includes an adjusting stand 1, a casing 2, a gear wheel 3, an operation rod 4, a threaded sleeve 5, a gear wheel 6 and an adjusting rod 7.

The adjusting stand 1 has a raised frame 11 formed in the inside of the adjusting stand 1 for mating with the casing 2. A holding block 12 having a half-round slot 121 is formed on an upper end of the frame 11. A gear stand 13 extends from the center of the adjusting stand 1, and two wave-shaped blocks 14 are formed on opposing sides thereof, each of the wave-shaped blocks have several fixing holes 141 formed therethrough. A fixture groove 15 is formed in the bottom side of the adjusting stand 1. The gear stand 13 is formed with a transverse holder 131 in the form of a bore passing therethrough to the outside and an opening 132 on the upper side of the holder 131.

The casing 2 is a hollow case that mates with the frame 11 of the adjusting stand 1. Casing 2 has a half-round slot 211 formed on one end of the opening 21 that is formed on the upper side of casing 2, in corresponding relationship with the holding block 12 and the half-round slot 121. Two wave-shaped blocks 22 are formed on opposing sides of casing 2, each wave-shaped block 22 having several fixing holes 221 formed therethrough. The blocks 22 are disposed in corresponding relationship with the blocks 14, the fixing holes 221 being aligned with the fixing holes 141. A fixture pin 23 is disposed on the bottom side of casing 2, opposite to the said fixture groove 15 on the adjusting stand 1.

The gear wheel 3 has a polygonal hole 31 formed at the center thereof for coupling with an operating rod 4. That assembly is located between the gear stand 13 and the holding block 12 of the adjusting stand 1. The operating rod 4 is located against the half-round slot 121 of the holding block 12.

The threaded sleeve 5 has an internally threaded through bore 52. One end 51 of sleeve 5 has a head formed thereon, the head end 51 having a spline-shaped configuration.

The gear wheel 6 has a centrally located spline-shaped hole 61 corresponding to the spline-shaped end 51 of the threaded sleeve 5, coupling with the threaded sleeve 5. That assembly is disposed with the threaded sleeve 5 positioned into the transverse holder 131 of the gear stand 13, mating the gear wheel 6 with the gear wheel 3.

The adjusting rod 7 has two ring-shaped slots 71 formed therein. A threaded slip ring 8 is positioned between the two ring-shaped slots 71, and retained thereon by two split collars 72 engaged within the ring-shaped slots 71, respectively. Slip ring 8 has an external thread 81 formed thereon, the thread 81 corresponding to the internal threads of sleeve 5.

Referring now to FIG. 2, the gear wheel 3 is shown meshing with the gear wheel 6 above the gear stand 13 of the adjusting stand 1. The threaded sleeve 5 is disposed in the transverse holder 131. Those elements are covered by the casing 2, with the fixture pin 23 and the opening 21 engaged with the fixture groove 15 and the holding block 12 of the adjusting stand 1, respectively. The operating rod 4 extends out from the hole defined by the two half-round slots 121 and 211 on the upper side of the adjusting stand 1 and the casing 2. The adjusting rod 7 is inserted into the threaded through bore 52 of sleeve 5 with the threaded slip ring 8 engaged with the threads of sleeve 5. The operating rod 4 is rotated to make the gear wheel 3 rotate, for driving the gear wheel 6 and the threaded sleeve 5 therewith. The rotation of threaded sleeve 5 displaces the slip ring 8 and the adjusting rod 7 therewith.

Referring to FIG. 3, the adjuster of the present invention is shown in combination with the body of the headlamp 9. The device is located at the back of the headlamp 9, the end of the adjusting rod 7 being connected to the body of the headlamp 9. Displacement of the adjusting rod 7 back and forth causes the headlamp 9 to tilt, changing angle thereof, for obtaining the best lighting efficiency.

I claim:

1. An adjuster for use in setting an angle of a car headlamp comprising:

an adjusting stand having a raised frame formed in an interior portion thereof and a fixture groove formed on a bottom side of said adjusting stand, said raised frame having a holding block formed on an upper end thereof, said holding block having a first half-round slot formed therein, said adjusting stand having a centrally located gear stand extending therefrom with a transverse holding bore formed therethrough, said gear stand having an opening formed on an upper side thereof in open communication with said transverse holding bore;

a casing having opposing upper and lower ends and an open cavity, said casing being coupled to said adjusting stand with said gear stand disposed within said cavity, said casing having an opening formed in said upper end adapted to receive said holding block therein and a fixture pin disposed on said lower end and extending therefrom for engagement with said fixture groove, said opening in said casing having a second half-round slot formed in an end thereof in correspondence with said first half-round slot to form a hole in open communication with said cavity when said holding block is received within said opening in said casing;

a first gear disposed in said cavity above said gear stand;

an operating rod drivingly coupled to said first gear for rotatable displacement thereof responsive to a rotative displacement of said operating rod, said operating rod extending from said coupling with said first gear through said hole formed by said first and second half-round slots;

a longitudinally extended sleeve member rotatably disposed within said transverse holding bore, said sleeve member having an internally threaded bore extending longitudinally therethrough;

a second gear meshingly engaged with said first gear and coupled to said sleeve member for rotation thereof responsive to rotation of said first gear;

an adjusting rod extending through said threaded bore of said sleeve member, said adjusting rod having a pair of spaced apart ring-shaped slots formed therein;

a slip ring member having external threads formed thereon and a through bore for receiving said adjusting rod therethrough, said slip ring member being positioned between said pair of spaced apart ring-shaped slots on said adjusting rod and threadedly engaged within said threaded bore of said sleeve member; and, a pair of split collars respectively engaged to said adjusting rod within said pair of ring-shaped slots for retention of said slip ring therebetween, wherein said adjusting rod is linearly displaced for displacing a portion of the car headlamp responsive to rotation of said operating rod.

* * * * *